(12) United States Patent
Mogi et al.

(10) Patent No.: US 7,816,046 B2
(45) Date of Patent: Oct. 19, 2010

(54) FUEL CELL APPARATUS HAVING FUEL CELL STACK AND CONTROLLER, AND METHOD OF MANUFACTURING SAME

(75) Inventors: Satoshi Mogi, Yamato (JP); Masaaki Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1244 days.

(21) Appl. No.: 11/300,349

(22) Filed: Dec. 15, 2005

(65) Prior Publication Data

US 2006/0141303 A1      Jun. 29, 2006

(30) Foreign Application Priority Data

Dec. 28, 2004    (JP) .............................. 2004-380510

(51) Int. Cl.
*H01M 8/04*        (2006.01)
*H01M 2/38*        (2006.01)

(52) U.S. Cl. ....................................... 429/428; 429/457

(58) Field of Classification Search ............. 429/12–46, 429/400–535

See application file for complete search history.

(56) References Cited

U.S. PATENT DOCUMENTS

| | | | | |
|---|---|---|---|---|
| 5,712,052 A | * | 1/1998 | Kawatsu | ....................... 429/13 |
| 5,771,476 A | * | 6/1998 | Mufford et al. | ................ 701/22 |
| 5,879,826 A | * | 3/1999 | Lehman et al. | ................ 429/13 |
| 2005/0221147 A1 | | 10/2005 | Shioya et al. | .................. 429/34 |

OTHER PUBLICATIONS

S. J. Lee, et al., "Design and fabrication of a micro fuel cell array with "flip-flop" interconnection", Journal of Power Sources, vol. 112, 2002, pp. 410-418.

* cited by examiner

*Primary Examiner*—Basia Ridley
*Assistant Examiner*—Jonathan G Leong
(74) *Attorney, Agent, or Firm*—Fitzpatrick, Cella, Harper & Scinto

(57) ABSTRACT

A fuel cell apparatus includes a fuel cell stack of a plurality of fuel cells electrically connected in series with each other and a controller configured to control the fuel cell stack by using a part of electric power generated by the fuel cell stack. The controller is electrically connected in parallel with at least one of the fuel cells constituting the fuel cell stack, and short-circuit current of the at least one of the fuel cells is larger than that of at least one of the fuel cells constituting the fuel cell stack and not being electrically connected in parallel with the control means. With such a structure, a large electromotive force can be obtained by connecting the fuel cells in series and, simultaneously, the power generation characteristics of each fuel cell can be sufficiently utilized. Thus, the fuel cell apparatus having high power generation density can be provided.

9 Claims, 8 Drawing Sheets

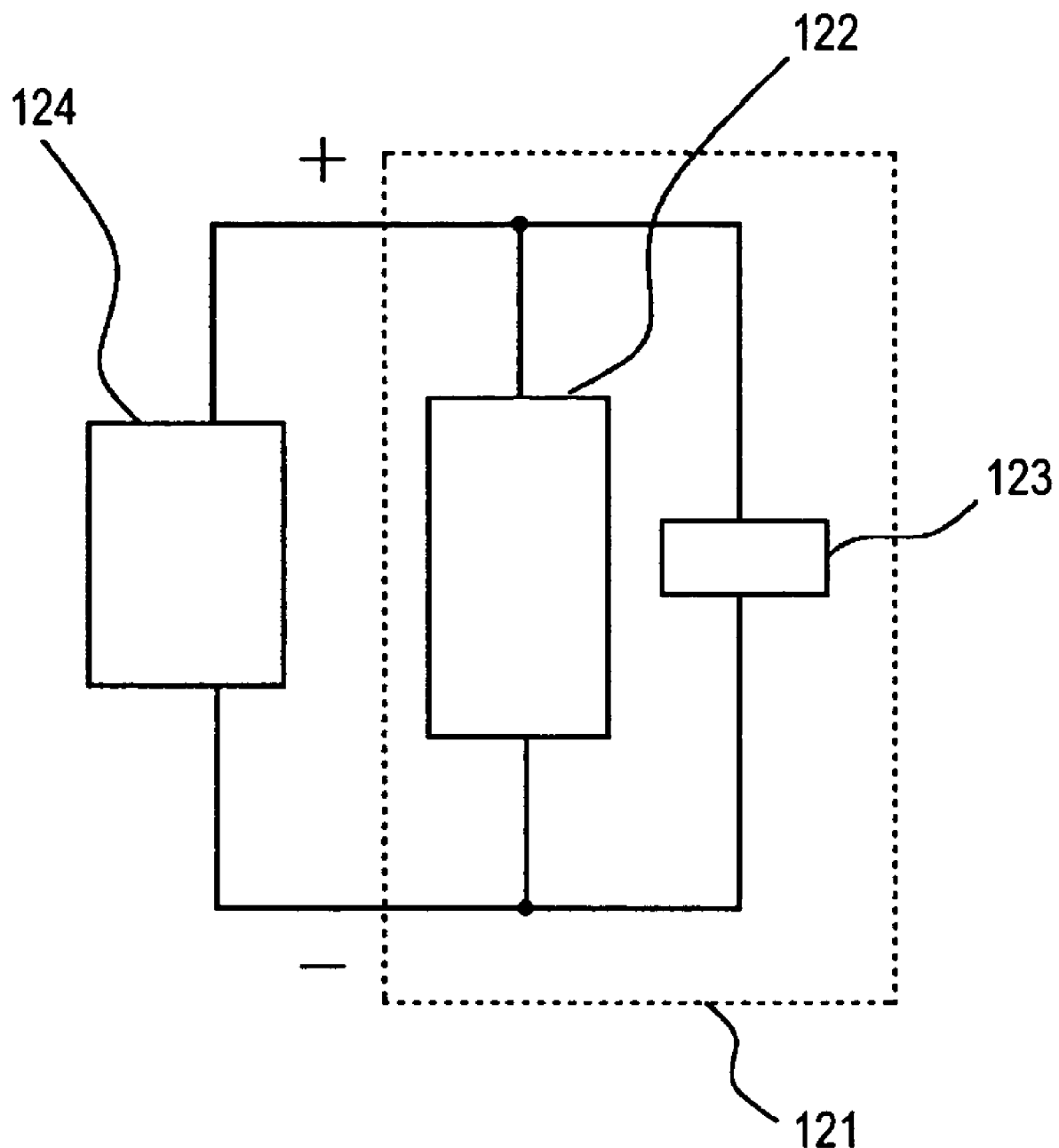

FUEL CELL APPARATUS HAVING FUEL CELL STACK AND CONTROLLER, AND METHOD OF MANUFACTURING SAME

BACKGROUND OF THE INVENTION

1. Field of the Invention

The present invention relates to fuel cell apparatuses and a method of manufacturing fuel cell apparatuses.

2. Description of the Related Art

Energy per volume that fuel cell apparatuses can generate is likely to become several to ten times larger than that of conventional cells, and the fuel cell apparatuses allow small-sized electric devices such as cell-phones and notebook PCs to be continuously used for a long period of time by filling the fuel cell apparatuses with fuel. Thus, the fuel cell apparatuses are expected to be used.

In a fuel cell, a fuel electrode having a catalyst and an oxidizer electrode having a catalyst are disposed on opposing faces of an electrolyte membrane, respectively. Fuel such as hydrogen gas is supplied to the fuel electrode, and an oxidant such as oxygen gas is supplied to the oxidizer electrode. These reactants react electrochemically through the electrolyte membrane therebetween.

When currents and voltages are measured while changing an external load on the fuel cell, a current-voltage curve as shown in FIG. 11 is obtained. In FIG. 11, Voc is called an open-circuit voltage and Isc is called a short-circuit current. As shown in the drawing, the output voltage decreases with an increase in the output current. Therefore, the output power has a peak in respect to the output current. Since the fuel cell generally has an electromotive force of only about 1 V, a plurality of fuel cells electrically connected in series with each other are used for driving an electric device.

The fuel cells are electrically connected in series with each other to make a vertical fuel cell stack by stacking the fuel cells so as to interpose conductive separators therebetween or to make a planar fuel cell stack by connecting the fuel cells arrayed on one plane surface with special wiring.

FIG. 12 is a drawing showing a structure of a conventional fuel cell apparatus. The fuel cell apparatus 121 supplies electric power to an electric device 124 by using the above-mentioned fuel cell stack 122. The fuel cell apparatus 121 includes various control means 123 in order to obtain stable output power. For example, the control means 123 include a pump and a valve for stably supplying fuel to the fuel cell stack, a fan for controlling operative temperature of the fuel cell stack, and a battery for aiding start of the fuel cell stack. These control means 123 are electrically connected in parallel with the fuel cell stack 122 and are operated by using a part of the power generated by the fuel cell stack.

Unevenness in power generation characteristics of the fuel cells of the fuel cell apparatus may occur on the basis of a method for arranging the fuel cells or a method for supplying an oxidant or fuel. For example, in Journal of Power Sources, 2002, 112: 410-418, F. B. Prinz, et al. have reported that unevenness in power generation characteristics occurs in a planar fuel cell stack. In other words, the above-mentioned short-circuit current of the fuel cells is different from that of each other. The causes are not clear, but it is pointed out that the short-circuit current decreases in the fuel cells arranged at the downstream of the oxidant or fuel and that there are some problems of pressure loss, reactant depletion, and moisture control.

If the fuel cell stack having such unevenness generates power at a level higher than a short-circuit current of any one of the fuel cells, the current may flow in the reverse direction in that fuel cell, which will deteriorate the power generation characteristics of the fuel cell. In this regard, it is believed that a voltage of power generated by other fuel cells is applied to the fuel cell and, as a result, electrolysis of water occurs in the fuel cell. In order to obtain stable output, the fuel cell apparatus is not operated in such a manner that the output current exceeds a short-circuit current of each fuel cell.

As described above, if the unevenness in the power generation characteristics of the fuel cells occurs in the fuel cell apparatus having the fuel cells electrically connected in series with each other, the output current of the fuel cell stack must be determined depending on the fuel cell of the smallest short-circuit current. Therefore, the power generation characteristics of each fuel cell cannot be sufficiently utilized. Furthermore, since a part of the output power from the fuel cell stack is supplied to the control means, power generation density of the fuel cell apparatus decreases, which is a problem.

SUMMARY OF THE INVENTION

The present invention has been accomplished to solve the foregoing problems in the conventional technologies, and provides a fuel cell apparatus including a fuel cell stack of a plurality of fuel cells electrically connected in series with each other and a control means for controlling the fuel cell stack with a part of the electric power generated by the fuel cell stack. In this fuel cell apparatus, the power generation characteristics of each fuel cell can be sufficiently utilized and high power generation density can be achieved even if the short-circuit current of each of the fuel cells constituting the fuel cell stack is different from that of each other.

A fuel cell apparatus of one aspect of the present invention includes a fuel cell stack of a plurality of fuel cells electrically connected in series with each other and a control means for controlling the fuel cell stack by using a part of electric power generated by the fuel cell stack. The control means is electrically connected in parallel with at least one of the fuel cells constituting the fuel cell stack, and short-circuit current of the at least one of the fuel cells is larger than that of at least one of the fuel cells constituting the fuel cell stack and not being electrically connected in parallel with the control means.

A fuel cell apparatus of another aspect of the present invention includes a fuel cell stack of a plurality of fuel cells electrically connected in series with each other, a control means for controlling the fuel cell stack by using a part of electric power generated by the fuel cell stack, an oxidizer channel for supplying an oxidant to the plurality of fuel cells, and a fuel channel for supplying fuel to the plurality of fuel cells. The control means is electrically connected in parallel with at least one of the fuel cells constituting the fuel cell stack and being placed at the upstream side of the oxidizer channel.

A fuel cell apparatus of a further aspect of the present invention includes a fuel cell stack of a plurality of fuel cells electrically connected in series with each other, a control means for controlling the fuel cell stack by using a part of electric power generated by the fuel cell stack, an oxidizer channel for supplying an oxidant to the plurality of fuel cells, and a fuel channel for supplying fuel to the plurality of fuel cells. The control means is electrically connected in parallel with at least one of the fuel cells constituting the fuel cell stack and being placed at the upstream side of the fuel channel.

In yet another aspect, the present invention relates to a fuel cell apparatus comprising: a fuel cell stack of a plurality of fuel cells electrically connected in series with each other; a controller constructed to control the fuel cell stack by using a part of electric power generated by the fuel cell stack, wherein the controller is electrically connected in parallel with at least one of the plurality of fuel cells, and wherein short-circuit current of the at least one of the plurality of fuel cells is larger than that of at least one of the plurality of fuel cells not being electrically connected in parallel with the controller.

In yet another aspect, the present invention relates to a fuel cell apparatus comprising: a fuel cell stack of a plurality of fuel cells electrically connected in series with each other; a controller constructed to control the fuel cell stack by using a part of electric power generated by the fuel cell stack; an oxidizer channel for supplying an oxidant to the plurality of fuel cells; and a fuel channel for supplying fuel to the plurality of fuel cells, wherein the controller is electrically connected in parallel with at least one of the plurality of fuel cells placed at the upstream side of the oxidizer channel.

In yet another aspect, the present invention relates to a fuel cell apparatus comprising: a fuel cell stack of a plurality of fuel cells electrically connected in series with each other; a controller constructed to control the fuel cell stack by using a part of electric power generated by the fuel cell stack; an oxidizer channel for supplying an oxidant to the plurality of fuel cells; and a fuel channel for supplying fuel to the plurality of fuel cells, wherein the controller is electrically connected in parallel with at least one of the plurality of fuel cells placed at the upstream side of the fuel channel.

In yet another aspect, the present invention relates to a method of manufacturing a fuel cell apparatus, said method comprising the steps of: preparing a fuel cell stack by electrically connecting a plurality of fuel cells in series with each other; electrically connecting a controller with at least one of the plurality of fuel cells in parallel, with the controller being constructed to control the fuel cell stack by using a part of electric power generated by the fuel cell stack, wherein short-circuit current of the at least one of the plurality of fuel cells is larger than that of at least one of the plurality of fuel cells not being electrically connected in parallel with the controller.

In yet another aspect, the present invention relates to a method of manufacturing a fuel cell apparatus comprising a fuel cell stack of a plurality of fuel cells electrically connected in series to each other and a controller configured to control the fuel cell stack by using a part of electric power generated by the fuel cell stack, said method comprising the steps of: forming a first flow plate comprising an oxidizer channel for supplying an oxidant to the plurality of fuel cells; forming a second flow plate comprising a fuel channel for supplying fuel to the plurality of fuel cells; preparing an electrode assembly by forming a plurality of oxidizer electrodes on one face of an electrolyte membrane and by forming a plurality of fuel electrodes on the other face of the electrolyte membrane; interposing the electrode assembly between the first and second flow plates; and electrically connecting the controller in parallel with at least one of the plurality of fuel cells placed at the upstream side of the oxidizer channel.

In still yet another aspect, the present invention relates to a method of manufacturing a fuel cell apparatus comprising a fuel cell stack of a plurality of fuel cells electrically connected in series to each other and a controller configured to control the fuel cell stack by using a part of electric power generated by the fuel cell stack, said method comprising the steps of: forming a first flow plate comprising an oxidizer channel for supplying an oxidant to the plurality of fuel cells; forming a second flow plate comprising a fuel channel for supplying fuel to the plurality of fuel cells; preparing an electrode assembly by forming a plurality of oxidizer electrodes on one face of an electrolyte membrane and by forming a plurality of fuel electrodes on the other face of the electrolyte membrane; interposing the electrode assembly between the first and second flow plates; and electrically connecting the controller in parallel with at least one of the plurality of fuel cells placed at the upstream side of the fuel channel.

According to the present invention, by connecting the fuel cells in series, a large electromotive force can be obtained and, simultaneously, the power generation characteristics of each fuel cell can be sufficiently utilized. Consequently, the fuel cell apparatus having high power generation density can be provided.

Other features and advantages of the present invention will be apparent from the following description taken in conjunction with the accompanying drawings.

BRIEF DESCRIPTION OF THE DRAWINGS

FIG. 12 is a block diagram of a conventional fuel cell apparatus.

DESCRIPTION OF THE EMBODIMENTS

Embodiments of the present invention will now be described with reference to the drawings.

Figure 1:
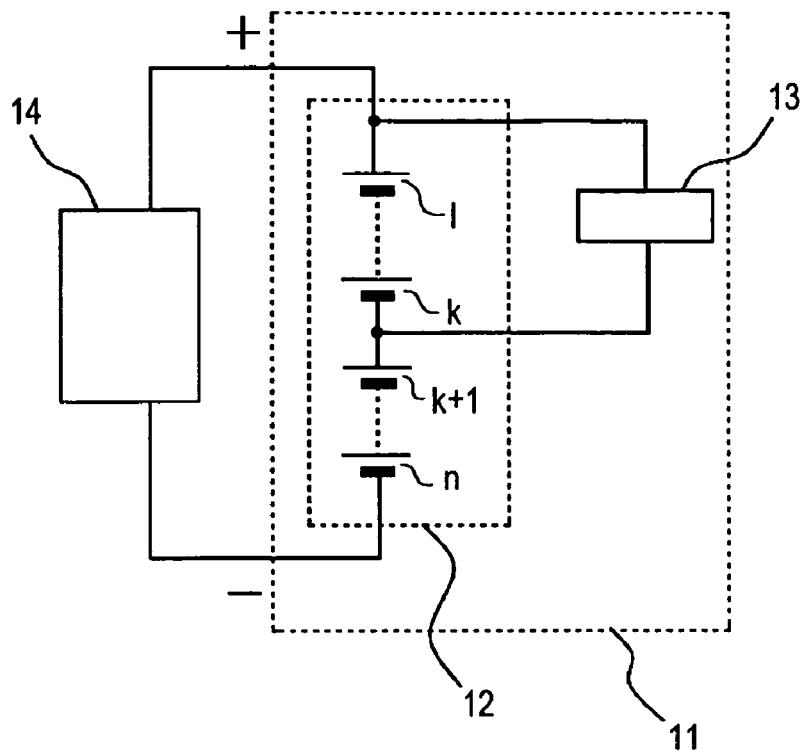
FIG. 1 is a block diagram of a fuel cell apparatus according to an embodiment of the present invention.

FIG. 1 shows a structure of a fuel cell apparatus 11 according to an embodiment of the present invention. A reference number 14 is an electric device driven by output power of the fuel cell apparatus. A reference number 12 is a fuel cell stack of a plurality of fuel cells electrically connected in series with each other. A controller, such as control means 13 for controlling the fuel cell stack is electrically connected with only a part of the plurality of fuel cells in parallel. The fuel cells connected with the control means in parallel have a short-circuit current at least higher than that of a fuel cell which is not connected with the control means in parallel.

The short-circuit current in this description is measured under conditions that a fuel cell stack of a plurality of fuel cells electrically connected in series with each other is mounted on a fuel cell apparatus.

The output power of the fuel cell may be converted by a power converter such as a DC/DC converter to a predetermined voltage and frequency and then may be connected with an electric device. The control means controls operation condition of the fuel cell stack and includes, for example, a pump and a valve for stably supplying fuel to the fuel cell stack, a fan for controlling operation temperature of the fuel cell stack, and a battery for aiding start of the fuel cell stack.

In FIG. 1, n sets of the fuel cells 1 to n are connected in series with each other and supply power to the electric device. The control means 13 is electrically connected with only the fuel cells 1 to k in parallel. With this, the control means is operated by using a part of electric power generated by the fuel cell stack. The short-circuit current of the fuel cells 1 to k connected with the control means 13 in parallel is at least higher than that of one of the remaining fuel cells k+1 to n.

Power generation by the fuel cell stack is determined such that the output current does not exceed a short-circuit current of each fuel cell. The fuel cells connected with the control means in parallel generate power of both the output current of the fuel cell stack and the current supplied to the control means at the same time. Therefore, the power generation characteristics of the fuel cells 1 to k can be sufficiently utilized.

As described above, according to the present invention, a high output voltage can be obtained by electrically connecting the plurality of fuel cells in series with each other and, simultaneously, the fuel cell apparatus of high power generation density can be provided.

The present invention will now be more specifically described with reference to the embodiments.

First Embodiment

Figure 2:
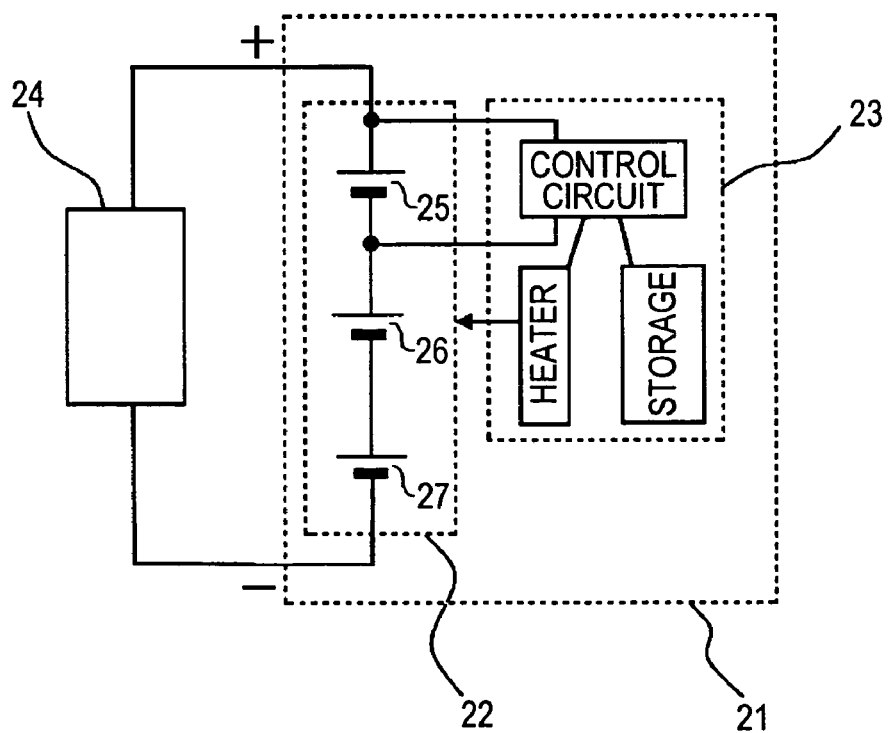
FIG. 2 is a block diagram of a fuel cell apparatus according to a first embodiment.
Figure 3:
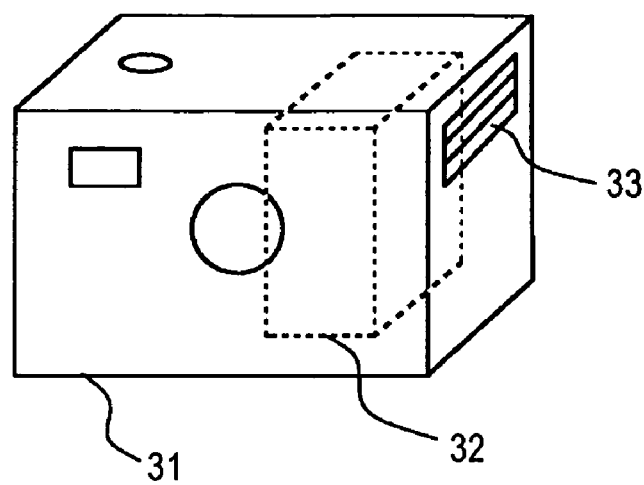
FIG. 3 is a schematic diagram of an electric device driven by the fuel cell apparatus according to the first embodiment.

FIG. 2 shows a fuel cell apparatus 21 according to a first embodiment of the present invention. A reference number 22 is a fuel cell stack, a reference number 23 is a control means, and a reference number 24 is an electric device driven by the fuel cell apparatus. The fuel cell apparatus is installed in a housing of an electric device 31 shown in FIG. 3. A reference number 32 is a position where the fuel cell stack is arranged, and a reference number 33 is an air hole provided to the housing of the electric device.

Figure 4:
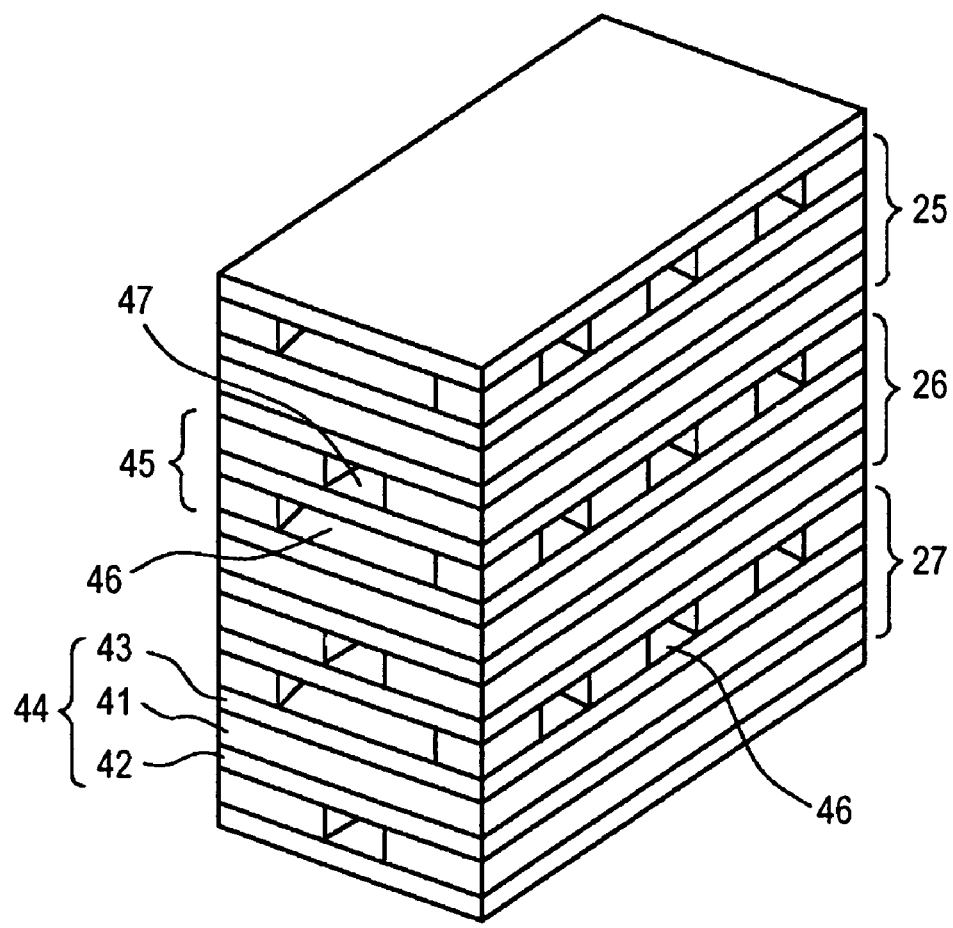
FIG. 4 is a schematic diagram of a fuel cell stack used in the fuel cell apparatus according to the first embodiment.

FIG. 4 shows a fuel cell stack used in this embodiment. An electrolyte electrode assembly 44 includes an electrolyte membrane 41, a fuel electrode 42 on one face of the electrolyte membrane 41, and an oxidizer electrode 43 on another face of the electrolyte membrane 41. The electrolyte electrode assemblies are stacked so that the fuel electrode of one electrolyte electrode assembly faces the oxidizer electrode of another electrolyte electrode assembly adjacent to the former electrolyte electrode assembly. An electrically conductive separator 45 is disposed between each of the electrolyte electrode assemblies. Thus, the electrolyte electrode assemblies are connected in series with each other. Each separator is provided with an oxidizer channel 46 for supplying an oxidant to the adjacent oxidizer electrode and a fuel channel 47 for supplying fuel to the adjacent fuel electrode.

In this embodiment, three fuel cells 25, 26, and 27 are stacked. The fuel is methanol, and the oxidant is oxygen in the atmosphere. Methanol as the fuel is supplied by a pipe (not shown). Oxygen consumed at the oxidizer electrode is fed through the air hole 33 provided on the housing of the electric device.

Figure 5:
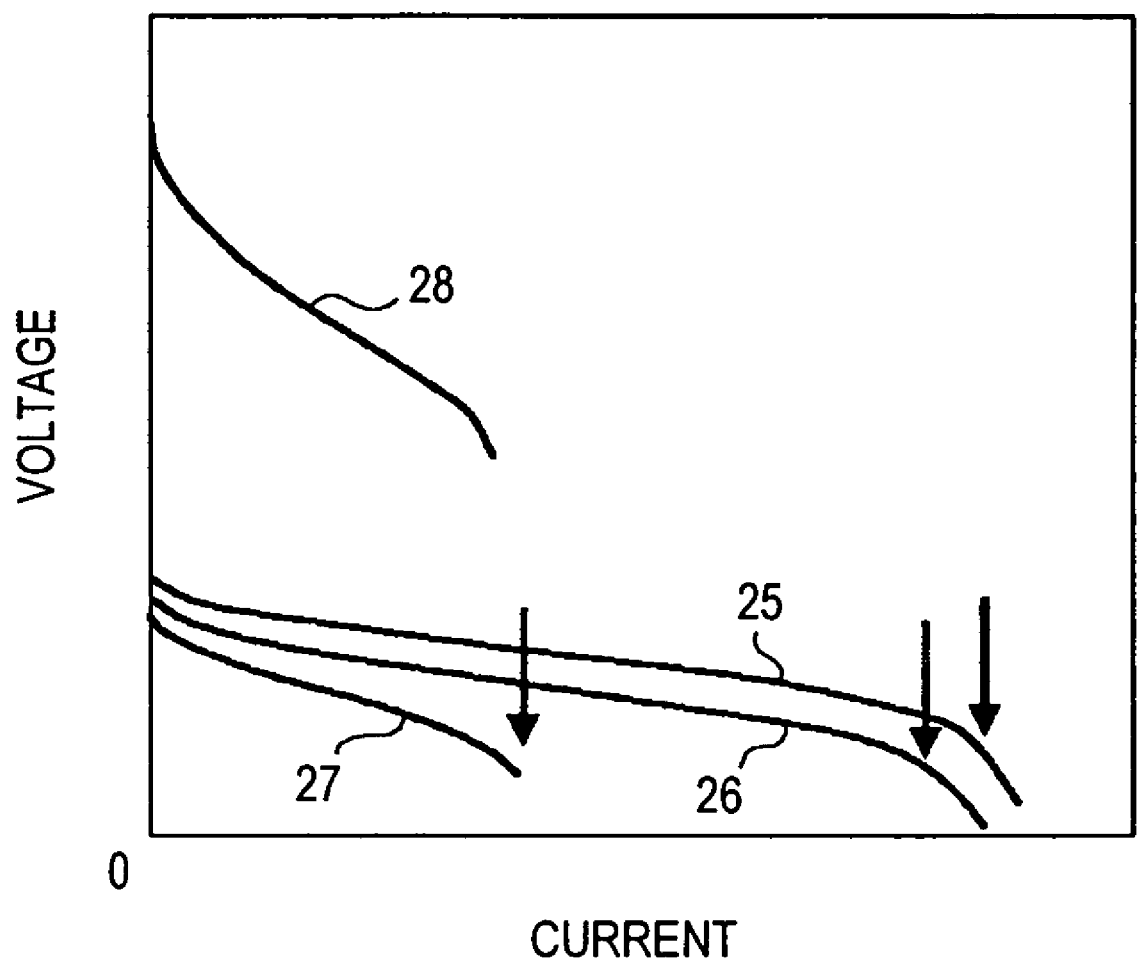
FIG. 5 is a graph showing current-voltage characteristics of the fuel cell apparatus and fuel cells according to the first embodiment.

FIG. 5 shows current-voltage curves of the fuel cells 25, 26, and 27. Short-circuit current of each fuel cell is shown by arrows in the drawing. The short-circuit current of the fuel cell 27 is the smallest in the three fuel cells. The cause is not clear, but the fuel cell 27 is disposed the farthest distance from the air hole 33 and it is presumed that shortage in supply of the oxidant is the cause.

As shown in FIG. 2, the control means is connected in parallel with the fuel cell 25. The short-circuit current of the fuel cell 25 is larger than that of the fuel cell 27. The control means heats the electrolyte membrane by using electric power which is stored in a storage part when the power generation of the fuel cell apparatus is started, and aids start of the fuel cell apparatus. The storage part is charged with a part of electric power generated by the fuel cell 25.

The output current of the fuel cell stack is used in the range not exceeding the short-circuit current of the fuel cell 27. A current-voltage curve of the fuel cell apparatus is shown by reference number 28 in FIG. 5. Since the fuel cells are connected in series with each other, a high output voltage can be supplied to the electric device. The electric power used in the control means, i.e., the electric power stored in the storage part, is a part of the electric power generated by the fuel cell 25, and the fuel cell apparatus can be stably started. As described above, according to this embodiment, the fuel cell apparatus of high power generation density can be provided.

Second Embodiment

Figure 6:
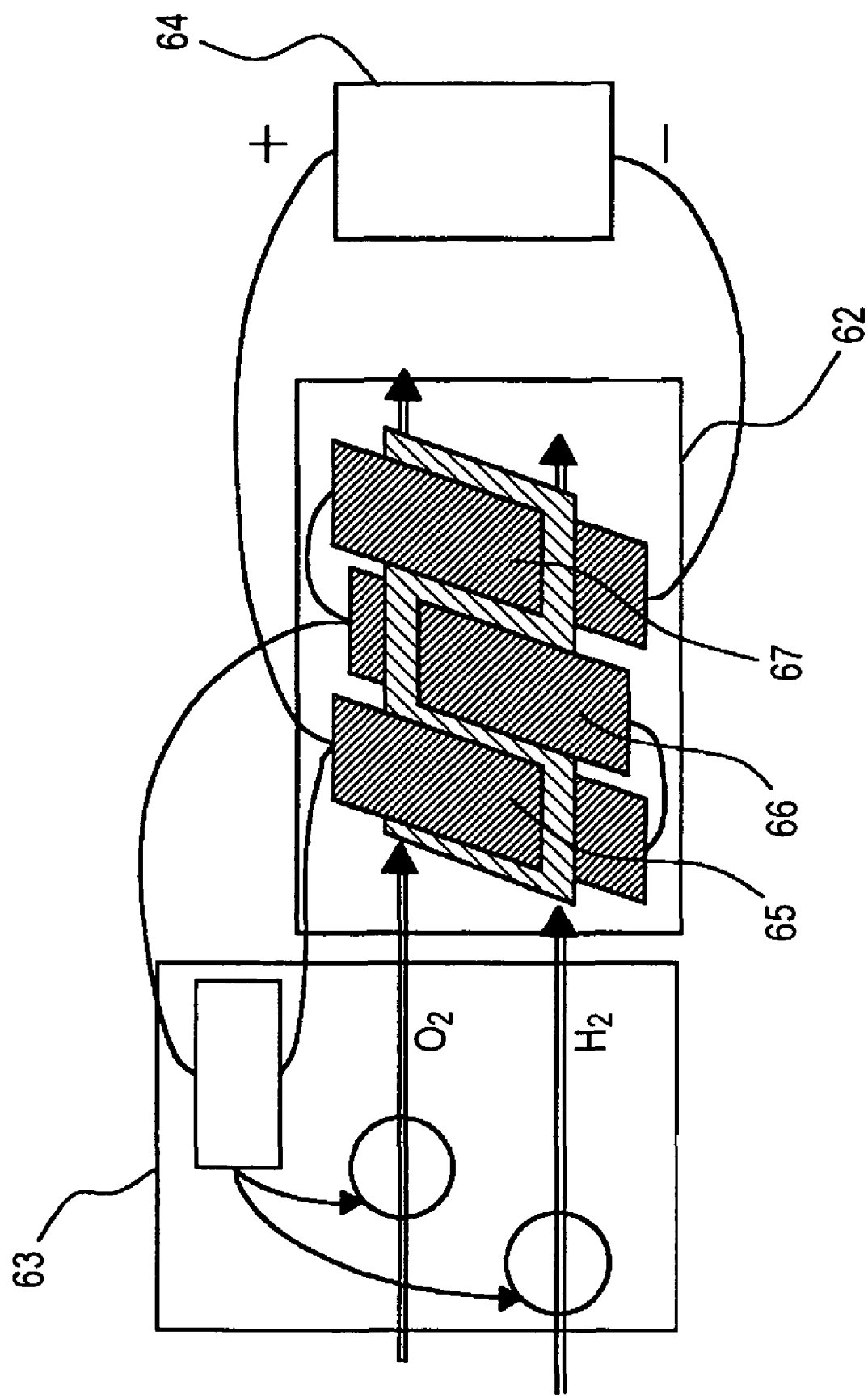
FIG. 6 is a block diagram of a fuel cell apparatus according to a second embodiment.

This embodiment relates to a fuel cell apparatus using a planar fuel cell stack. FIG. 6 is a schematic view of the fuel cell apparatus. A reference number 62 is a fuel cell stack, and a reference number 64 is an electric device driven by the fuel cell apparatus. This fuel cell apparatus utilizes oxygen and hydrogen supplied from the outside to generate electric power. A controller, such as control means 63, controls flow rates corresponding to output of the fuel cell stack and supplies oxygen and hydrogen to the fuel cell stack.

Figure 7A:
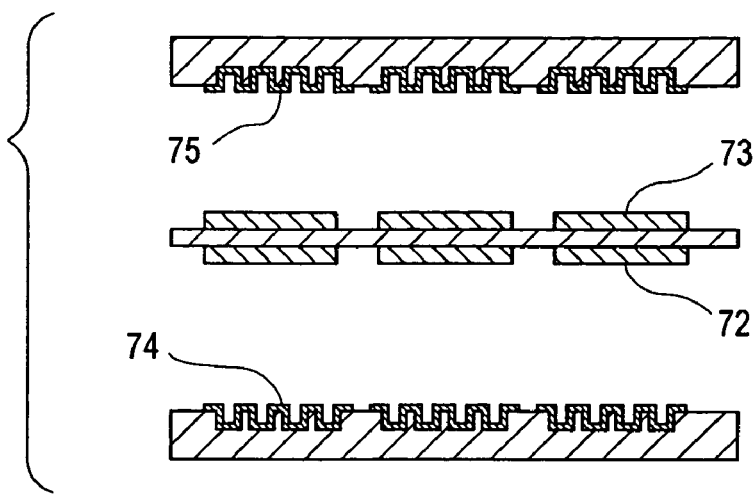
FIG. 7A is a schematic diagram of a fuel cell stack used in the fuel cell apparatus according to the second embodiment.
Figure 7B:
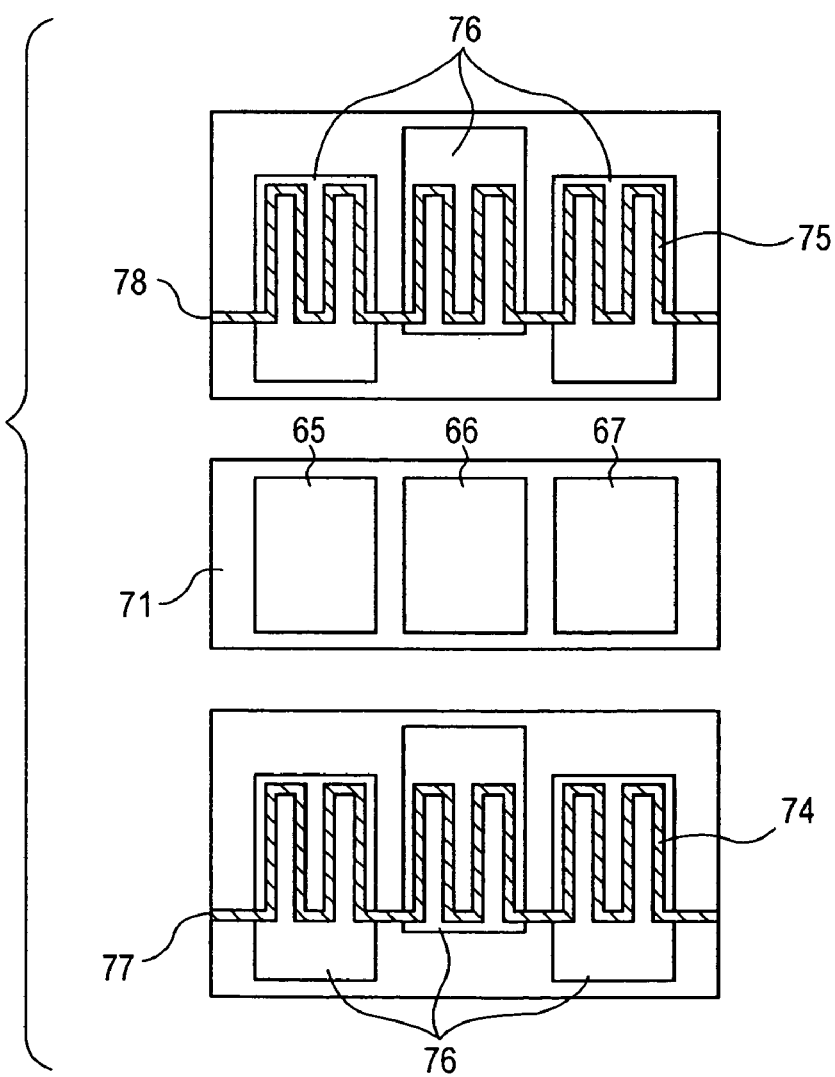
FIG. 7B is a schematic diagram of the fuel cell stack used in the fuel cell apparatus according to the second embodiment.

FIG. 7A shows cross-sectional views of each member of the planar fuel cell stack, and FIG. 7B shows the plan views of them. As shown in the drawings, fuel electrodes 72 and oxidizer electrodes 73 are formed on both faces of an electrolyte membrane 71, respectively. A fuel channel 74 for supplying hydrogen to the fuel electrodes is formed so as to be in contact with the fuel electrodes, and an oxidizer channel 75 for supplying oxygen to the oxidizer electrodes is formed so as to be in contact with the oxidizer electrodes. A substrate on which the fuel channel and the oxidizer channel are formed is provided with extraction electrodes 76 having a shape shown in the drawing. An inlet 77 of the fuel channel and an inlet 78 of the oxidizer channel are connected with pipes introducing hydrogen and oxygen, respectively.

Figure 8A:
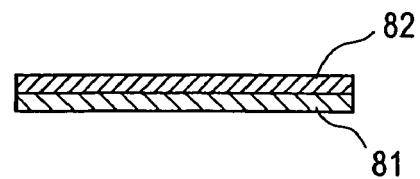
FIG. 8 is a drawing showing a manufacturing process of electrolyte electrode assemblies according to the second embodiment.
Figure 8B:
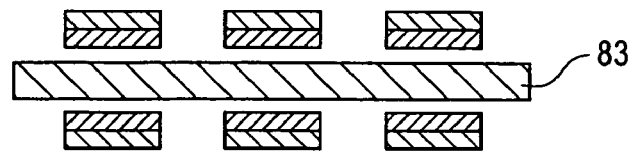
Figure 8C:
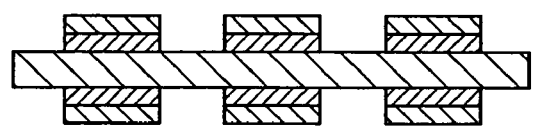

FIG. 8 shows a method for manufacturing the electrolyte electrode assemblies. The electrolyte membrane is made of a perfluorosulfonic acid-based polymer, and the catalyst is platinum supported on carbon. A solution mixture of an ion-exchange resin solution and the catalyst is applied to a surface of carbon paper 81 and then is dried (FIG. 8A). The carbon paper on which a catalyst layer 82 is formed is cut into a desired shape. The paper pieces are disposed on both faces of the electrolyte membrane 83 and are press-bonded to the electrolyte membrane with a press (FIG. 8B). Thus, the three electrolyte electrode assemblies are formed on a plane surface (FIG. 8C).

Figure 9A:
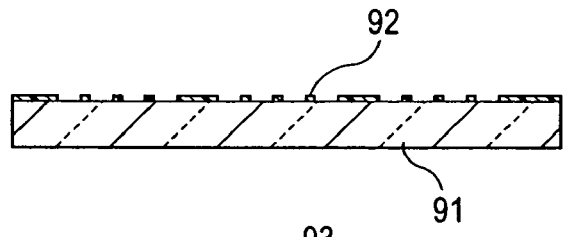
FIG. 9 is a drawing showing a manufacturing process of a passage according to the second embodiment.
Figure 9B:
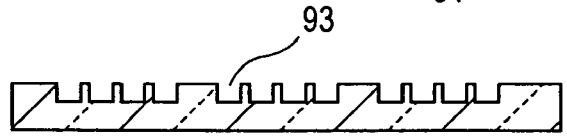
Figure 9C:
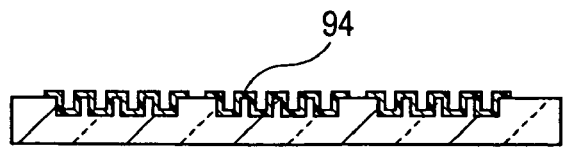

FIG. 9 shows a method for manufacturing a passage substrate. A film as a mask of amorphous silicon is formed on a glass substrate 91 by a chemical vapor deposition (CVD) method, and then plasma etching is performed for patterning 92 (FIG. 9A). A passage 93 is formed in the glass substrate by wet etching, and then the mask is removed (FIG. 9B). A mask for patterning of extraction electrodes is formed, and a film 94 of gold is formed on the glass substrate having the passage (FIG. 9C).

A passage board for fuel, a passage board for oxidant, and the electrolyte electrode assemblies are arranged such that the electrolyte electrode assemblies are interposed between both passage boards and that the face having the passage of each of the passage boards opposes the electrolyte electrode assemblies. Then, these three components are press-bonded with a supporting plate (not shown). At this time, the extraction electrodes are provided with a wire to enable the extraction of electricity from the fuel cells. Furthermore, the inlet of the fuel channel and the inlet of the oxidizer channel are provided with pipes to enable the supply of hydrogen and oxygen, respectively, to the fuel cells. Thus, the planar fuel cell stack of the three fuel cells 65, 66, and 67 which are disposed on the same plane is constituted.

Figure 10:
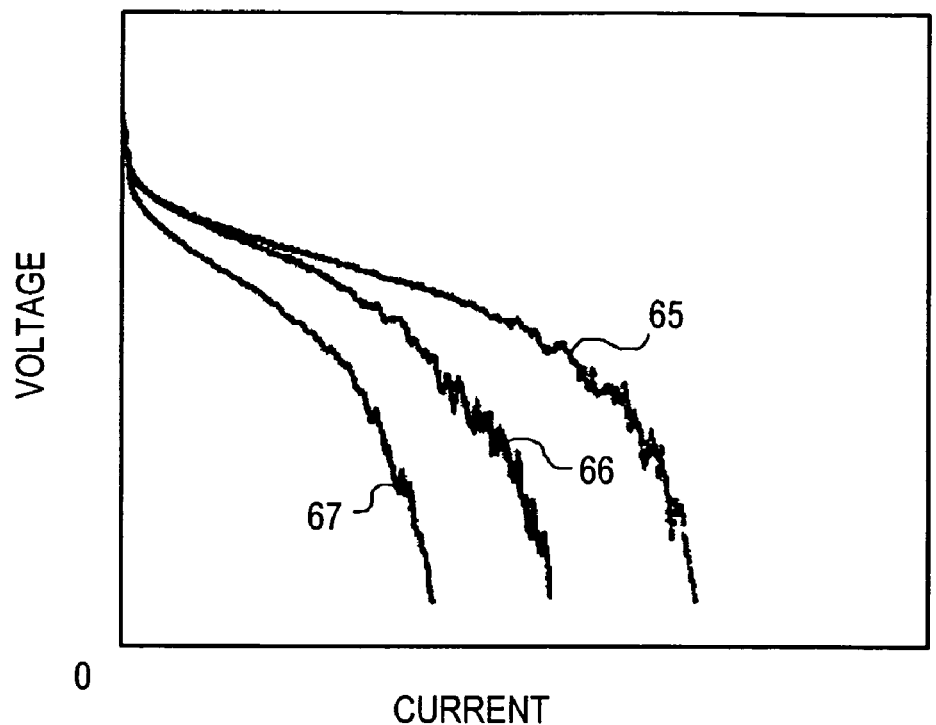
FIG. 10 is a graph showing current-voltage characteristics of the fuel cells according to the second embodiment.
Figure 11:
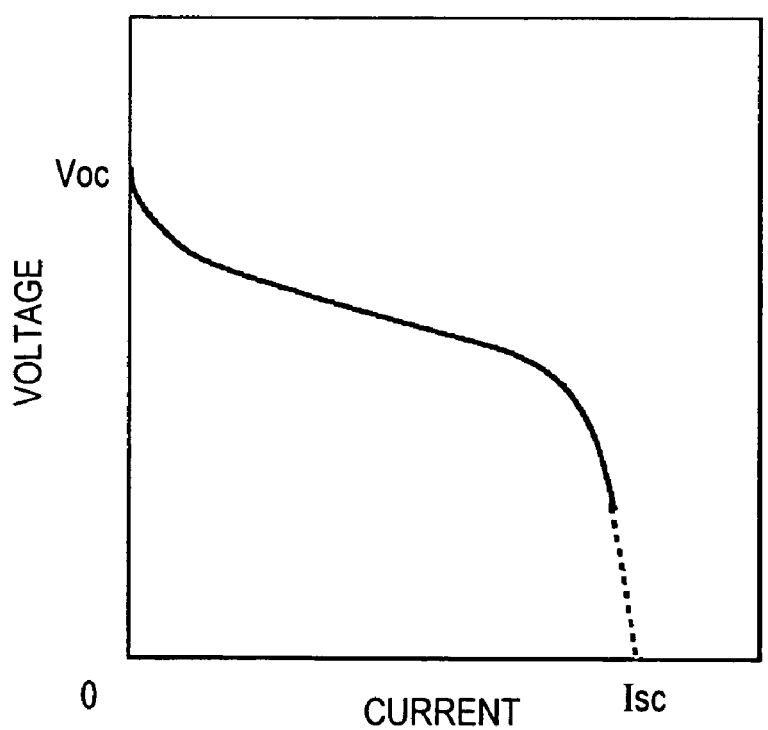
FIG. 11 is a graph describing current-voltage characteristics of a fuel cell.

FIG. 10 shows the current-voltage curves of the fuel cells 65, 66, and 67 of the fuel cell stack. The short-circuit current of the fuel cell 65 is the largest, then that of the fuel cell 66, and that of the fuel cell 67 is the smallest. The causes of the difference in power generation characteristics among the fuel cells are not clear, but the short-circuit current of the fuel cells disposed at the downstream side of oxygen or hydrogen decreases and it is thought that there are some problems of pressure loss, reactant depletion, and moisture control. Therefore, at least one of the fuel cells constituting the fuel cell stack and being disposed at the upstream side of the fuel channel is electrically connected with the control means in parallel. Alternatively, at least one of the fuel cells constituting the fuel cell stack and being disposed at the upstream side of the oxidizer channel is electrically connected with the control means in parallel.

The three fuel cells 65, 66, and 67 of the fuel cell stack are connected in series with each other with wiring and supply electric power to an electric device. Since the fuel cells are connected in series with each other, the fuel cell apparatus can supply a high output voltage to the electric device. The fuel cell apparatus can supply electric power to the electric device 64 in the range not exceeding the short-circuit current of the fuel cell 67. Furthermore, only the fuel cells 65 and 66 are connected with the control means in parallel. With this, the control means controls the supply of the fuel and the oxidant by using electric power generated by the fuel cells 65 and 66. Thus, the power generation by the fuel cell apparatus is stably performed. As described above, according to this embodiment, the fuel cell apparatus of high power generation density can be provided.

In the fuel cell apparatus according to the present invention, a large electromotive force is achieved by connecting the fuel cells in series with each other and, simultaneously, high power generation density is achieved by sufficiently utilizing the power generation characteristics of each of the fuel cells. Therefore, the fuel cell apparatus can be utilized as a power supply for a small-sized electric device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-380510 filed Dec. 28th, 2004, which is hereby incorporated by reference herein in its entirety.

What is claimed is:

1. A fuel cell apparatus comprising:
a fuel cell stack including a plurality of fuel cells electrically connected in series with each other; and
control means for controlling the fuel cell stack by using a part of electric power generated by the fuel cell stack,
wherein the control means is electrically connected in parallel with a portion of the fuel cell stack,
wherein a short-circuit current of the portion of the fuel cell stack is larger than that of another portion of the fuel cell stack not being electrically connected in parallel with the control means, and
wherein the portion of the fuel cell stack and the other portion of the fuel cell stack not being electrically connected in parallel with the control means are connected in series and supply power to a load.

2. A fuel cell apparatus comprising:
a fuel cell stack including a plurality of fuel cells electrically connected in series with each other;
control means for controlling the fuel cell stack by using a part of electric power generated by the fuel cell stack;
an oxidizer channel for supplying an oxidant to the plurality of fuel cells; and
a fuel channel for supplying fuel to the plurality of fuel cells,
wherein the control means is electrically connected in parallel with a portion of the fuel cell stack placed at the upstream side of the oxidizer channel, and
wherein the portion of the fuel cell stack and another portion of the fuel cell stack not being electrically connected in parallel with the control means are connected in series and supply power to a load.

3. A fuel cell apparatus comprising:
a fuel cell stack including a plurality of fuel cells electrically connected in series with each other;
control means for controlling the fuel cell stack by using a part of electric power generated by the fuel cell stack;
an oxidizer channel for supplying an oxidant to the plurality of fuel cells; and
a fuel channel for supplying fuel to the plurality of fuel cells,
wherein the control means is electrically connected in parallel with a portion of the fuel cell stack placed at the upstream side of the fuel channel, and
wherein the portion of the fuel cell stack and another portion of the fuel cell stack not being electrically connected in parallel with the control means are connected in series and supply power to a load.

4. A fuel cell apparatus comprising:
a fuel cell stack including a plurality of fuel cells electrically connected in series with each other; and
a controller constructed to control the fuel cell stack by using a part of electric power generated by the fuel cell stack,
wherein the controller is electrically connected in parallel with a portion of the fuel cell stack,
wherein a short-circuit current of the portion of the fuel cell stack is larger than that of another portion of the fuel cell stack not being electrically connected in parallel with the controller, and
wherein the portion of the fuel cell stack and the other portion of the fuel cell stack not being electrically connected in parallel with the control means are connected in series and supply power to a load.

5. A fuel cell apparatus comprising:
a fuel cell stack including a plurality of fuel cells electrically connected in series with each other;
a controller constructed to control the fuel cell stack by using a part of electric power generated by the fuel cell stack;
an oxidizer channel for supplying an oxidant to the plurality of fuel cells; and
a fuel channel for supplying fuel to the plurality of fuel cells,
wherein the controller is electrically connected in parallel with a portion of the fuel cell stack placed at the upstream side of the oxidizer channel, and
wherein the portion of the fuel cell stack and another portion of the fuel cell stack not being electrically connected in parallel with the control means are connected in series and supply power to a load.

6. A fuel cell apparatus comprising:
a fuel cell stack including a plurality of fuel cells electrically connected in series with each other;
a controller constructed to control the fuel cell stack by using a part of electric power generated by the fuel cell stack;
an oxidizer channel for supplying an oxidant to the plurality of fuel cells; and
a fuel channel for supplying fuel to the plurality of fuel cells,
wherein the controller is electrically connected in parallel with a portion of the fuel cell stack placed at the upstream side of the fuel channel, and
wherein the portion of the fuel cell stack and another portion of the fuel cell stack not being electrically connected in parallel with the control means are connected in series and supply power to a load.

7. A method of manufacturing a fuel cell apparatus, the method comprising the steps of:
preparing a fuel cell stack by electrically connecting a plurality of fuel cells in series with each other; and
electrically connecting a controller with a portion of the fuel cell stack in parallel, with the controller being constructed to control the fuel cell stack by using a part of electric power generated by the fuel cell stack,
wherein a short-circuit current of the portion of the fuel cell stack is larger than that of another portion of the fuel cell stack not being electrically connected in parallel with the controller, and
wherein the portion of the fuel cell stack and the other portion of the fuel cell stack not being electrically connected in parallel with the control means are connected in series and supply power to a load.

8. A method of manufacturing a fuel cell apparatus comprising a fuel cell stack including a plurality of fuel cells electrically connected in series to each other and a controller configured to control the fuel cell stack by using a part of electric power generated by the fuel cell stack, the method comprising the steps of:
forming a first flow plate comprising an oxidizer channel for supplying an oxidant to the plurality of fuel cells;
forming a second flow plate comprising a fuel channel for supplying fuel to the plurality of fuel cells;
preparing an electrode assembly by forming a plurality of oxidizer electrodes on one face of an electrolyte membrane and by forming a plurality of fuel electrodes on the other face of the electrolyte membrane;
interposing the electrode assembly between the first and second flow plates; and
electrically connecting the controller in parallel with a portion of the fuel cell stack placed at the upstream side of the oxidizer channel,
wherein the portion of the fuel cell stack and another portion of the fuel cell stack not being electrically connected in parallel with the control means are connected in series and supply power to a load.

9. A method of manufacturing a fuel cell apparatus comprising a fuel cell stack including a plurality of fuel cells electrically connected in series to each other and a controller configured to control the fuel cell stack by using a part of electric power generated by the fuel cell stack, the method comprising the steps of:
forming a first flow plate comprising an oxidizer channel for supplying an oxidant to the plurality of fuel cells;
forming a second flow plate comprising a fuel channel for supplying fuel to the plurality of fuel cells;
preparing an electrode assembly by forming a plurality of oxidizer electrodes on one face of an electrolyte membrane and by forming a plurality of fuel electrodes on the other face of the electrolyte membrane;
interposing the electrode assembly between the first and second flow plates; and
electrically connecting the controller in parallel with a portion of the fuel cell stack placed at the upstream side of the fuel channel,
wherein the portion of the fuel cell stack and another portion of the fuel cell stack not being electrically connected in parallel with the control means are connected in series and supply power to a load.

* * * * *